United States Patent
Kim et al.

(10) Patent No.: US 12,552,319 B2
(45) Date of Patent: Feb. 17, 2026

(54) APPARATUS AND METHOD FOR BLIND-SPOT MONITORING OF VEHICLE BASED ON REAR CAMERA

(71) Applicants: Hyundai Motor Company, Seoul (KR); Kia Corporation, Seoul (KR)

(72) Inventors: Jeong Hoon Kim, Seoul (KR); Run Fei Wang, Shandong (CN); Jin Wook Choi, Seoul (KR); Ming Xia Xu, Shandong (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 150 days.

(21) Appl. No.: 18/532,433

(22) Filed: Dec. 7, 2023

(65) Prior Publication Data

US 2025/0018864 A1    Jan. 16, 2025

(30) Foreign Application Priority Data

Jul. 14, 2023 (CN) .......................... 202310870933.5

(51) Int. Cl.
*B60R 1/26* (2022.01)
*B60Q 9/00* (2006.01)
*B62D 9/00* (2006.01)

(52) U.S. Cl.
CPC ............... *B60R 1/26* (2022.01); *B60Q 9/008* (2013.01); *B62D 9/005* (2013.01); *B60R 2300/10* (2013.01); *B60R 2300/20* (2013.01); *B60R 2300/802* (2013.01); *B60R 2300/8093* (2013.01)

(58) Field of Classification Search
CPC ....... B60Q 9/008; B60R 1/26; B60R 2300/10; B60R 2300/20; B60R 2300/802; B60R 2300/8093; B62D 15/0265; B62D 9/005
See application file for complete search history.

(56) References Cited

U.S. PATENT DOCUMENTS

| | | | |
|---|---|---|---|
| 9,586,525 B2 * | 3/2017 | Sejalon | B60Q 9/008 |
| 10,531,016 B2 * | 1/2020 | Saeki | G06V 20/58 |
| 10,688,868 B2 * | 6/2020 | Hayashi | B60K 35/22 |
| 2006/0069478 A1 * | 3/2006 | Iwama | B62D 15/028 |
| | | | 701/1 |
| 2010/0013930 A1 * | 1/2010 | Matsuo | G06T 11/00 |
| | | | 348/148 |
| 2014/0055616 A1 * | 2/2014 | Corcoran | H04N 23/69 |
| | | | 348/148 |
| 2014/0293057 A1 * | 10/2014 | Wierich | G06V 20/58 |
| | | | 348/148 |

(Continued)

*Primary Examiner* — Carl C Staubach
(74) *Attorney, Agent, or Firm* — Banner & Witcoff, Ltd.

(57) ABSTRACT

The present disclosure provides apparatus and method for blind-spot monitoring of vehicle based on rear camera. A blind spot view monitoring apparatus, for a vehicle based on a rear camera, may include an image acquisition unit, a control unit and a display unit. The image acquisition unit is configured to obtain a rear image from a rear camera mounted on a vehicle. The control unit is configured to set a region of interest in the rear image based on a turn signal or a lane departure signal of the vehicle, to determine whether there is a risk of proximity of an object in the region of interest to the vehicle, and to generate a blind spot image based on whether there is the risk of proximity. The display unit is configured to display the blind spot image.

18 Claims, 6 Drawing Sheets

(56) References Cited

U.S. PATENT DOCUMENTS

| | | | |
|---|---|---|---|
| 2016/0059781 A1* | 3/2016 | Tatara | B60R 1/26 |
| | | | 348/148 |
| 2017/0162042 A1* | 6/2017 | Dooley | G01S 11/12 |
| 2017/0225620 A1* | 8/2017 | Hasegawa | H04N 7/181 |
| 2017/0232964 A1* | 8/2017 | Moritani | B60T 7/22 |
| | | | 701/70 |

* cited by examiner

APPARATUS AND METHOD FOR BLIND-SPOT MONITORING OF VEHICLE BASED ON REAR CAMERA

CROSS-REFERENCE TO RELATED APPLICATION

The present application claims priority to Chinese Patent Application No. 202310870933.5, filed on Jul. 14, 2023, the entire contents of which are incorporated herein by reference.

TECHNICAL FIELD

The present disclosure relates to a blind spot monitoring apparatus for a vehicle.

BACKGROUND

There is a blind spot that a driver cannot check through a side mirror in a front, a rear, and a side of a passenger seat of a vehicle. In particular, if there is an object in a blind spot when the driver changes a lane while driving, the driver may not recognize the object. So there is a high risk of an accident that may be caused by a collision.

A blind-spot view monitor (BVM) is a technology that displays an image of a rear blind spot in a corresponding direction on a cluster screen when a turn signal switch is operated, assisting a driver in driving safely.

Blind-spot view monitors may provide images of a rear blind spot using a side camera mounted on a lower portion of a side mirror. For example, when a driver operates a turn signal switch to change a lane, a rear side view image may be acquired from a side camera in a corresponding direction and the acquired rear side view image may be displayed on a cluster, a room mirror, a head-up display (HUD), a navigation system, etc., thereby assisting the driver in driving safely.

However, an image provided by the blind-spot view monitors may be taken from the viewpoint of a side mirror, so it may be difficult to accurately determine, based on the image, a distance from the end of a rear bumper of the vehicle to the front of another vehicle approaching from a rear side or the speed of the another vehicle. It may also be difficult to recognize a risk of collision with the other vehicle approaching from a rear side, so that a driver has to suffer the inconvenience of additionally checking whether there is another vehicle approaching the driver's vehicle when the driver attempts to perform a lane change.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

The present disclosure relates to a blind spot monitoring apparatus for a vehicle based on a rear camera and the operating method thereof. For example, an apparatus may assist a driver by displaying a blind spot view of a vehicle based on driving conditions using an image obtained by a rear camera.

According to an aspect of the present disclosure, it may be possible to provide an image of a rear blind spot of a vehicle using a rear camera.

According to an aspect of the present disclosure, it may be possible to provide an image of a rear blind spot of a vehicle to precisely determine a distance between an object in the blind spot and the vehicle.

According to an aspect of the present disclosure, it may be possible to provide a danger warning according to the proximity of another vehicle with an image of a rear blind spot of the vehicle.

According to an aspect of the present disclosure, it may be possible to automatically provide an image of a rear blind spot of a vehicle when a lane departure is detected.

The purposes of the present disclosure are not limited to the aforementioned purposes, and other purposes not mentioned above will be clearly understood by a person having ordinary skills in the art through the following description.

An apparatus may comprise: a display device: at least one processor; and memory storing instructions that, when executed by the at least one processor, cause the apparatus to: obtain a rear-view image based on an operation of a rear camera of a vehicle, wherein the rear-view image is an adjusted image for blind spot monitoring of at least one blind spot of the vehicle; set a region of interest in the rear-view image, wherein the region of interest is associated with at least one blind spot of the vehicle; determine that an object is in the region of interest; determine, based on the object being in the region of interest, to display a blind spot image; and display, via the display device, the blind spot image.

The apparatus may further comprise the rear camera, wherein the rear camera is configured to apply an asymmetric lens distortion to generate the rear-view image for blind spot monitoring, and wherein the rear-view image is adjusted by applying the asymmetric lens distortion to a captured image of the rear camera.

The instructions, when executed by the at least one processor, may further cause the apparatus to: calculate, using an ultrasonic sensor, a distance between the object in the region of interest and the vehicle; and determine, based on the calculated distance, that a risk of collision is greater than a threshold. The instructions, when executed by the at least one processor, may cause the apparatus to determine to display the blind spot image further based on the risk of collision being greater than the threshold.

The instructions, when executed by the at least one processor, may further cause the apparatus to: calculate a relative speed between the object in the region of interest and the vehicle, and determine, based on the calculated relative speed, that a risk of collision is greater than a threshold. The instructions, when executed by the at least one processor, may cause the apparatus to determine to display the blind spot image further based on the risk of collision being greater than the threshold.

The instructions, when executed by the at least one processor, may cause the apparatus to calculate the relative speed by calculating, using a plurality of consecutive rear images obtained from the rear camera, the relative speed between the object in the region of interest and the vehicle.

The instructions, when executed by the at least one processor, may further cause the apparatus to generate the blind spot image, wherein the blind spot image comprises one or more lateral distance guide lines and one or more longitudinal distance guide lines.

The blind spot image may further comprise a warning indicator for indicating a collision risk.

The instructions, when executed by the at least one processor, may further cause the apparatus to transmit, to a vibration generator of a steering wheel of the vehicle, a control signal for generating a vibration signal based on: steering information of the vehicle; the object being in the region of interest; and a determination that a risk of collision is greater than a threshold.

The instructions, when executed by the at least one processor, may further cause the apparatus to transmit, to a brake controller, a control signal for applying braking force to rear wheels of the vehicle in a steering direction based on: steering information of the vehicle; the object being in the region of interest; and a determination that a risk of collision is greater than a threshold.

The instructions, when executed by the at least one processor, may cause the apparatus to set the region of interest based on: a turn signal of the vehicle; or a lane departure signal of the vehicle.

A method performed by an apparatus of a vehicle may comprise: obtaining a rear-view image based on an operation of a rear camera of the vehicle, wherein the rear-view image is an adjusted image for blind spot monitoring of at least one blind spot of the vehicle: setting a region of interest in the rear-view image, wherein the region of interest is associated with the at least one blind spot of the vehicle: determining that an object is in the region of interest: determining, based on the object being in the regions of interest, to display a blind spot image; and displaying, via a display device, the blind spot image.

The rear camera may be configured to apply an asymmetric lens distortion to generate the rear-view image for blind spot monitoring, and the rear-view image may be adjusted by applying the asymmetric lens distortion to a captured image of the rear camera.

The method may further comprise: calculating, using an ultrasonic sensor, a distance between the object in the region of interest and the vehicle; and determining, based on the calculated distance, that a risk of collision is greater than a threshold. The determining to display the blind spot image may be further based on the risk of collision being greater than the threshold.

The method may further comprise: calculating a relative speed between the object in the region of interest and the vehicle; and determining, based on the calculated relative speed, that a risk of collision if greater than a threshold. The determining to display the blind spot image may be further based on the risk of collision being greater than the threshold.

The calculating may comprise calculating, using a plurality of consecutive rear images obtained from the rear camera, the relative speed between the object in the region of interest and the vehicle.

The method may further comprise generating the blind spot image, wherein the blind spot image comprises one or more lateral distance guide lines and one or more longitudinal distance guide lines.

The blind spot image may further comprise a warning indicator for indicating a collision risk.

The method may further comprise transmitting, to a vibration generator of a steering wheel of the vehicle, a control signal for generating a vibration signal based on: steering information of the vehicle; the object being in the region of interest; and a determination that a risk of collision is greater than a threshold.

The method may further comprise transmitting, to a brake controller, a control signal for applying braking force to rear wheels of the vehicle in a steering direction based on: steering information of the vehicle: the object being in the region of interest; and a determination that a risk of collision is greater than a threshold.

The setting the region of interest may be based on: a turn signal of the vehicle; or a lane departure signal of the vehicle.

According to an aspect of the present disclosure, it may be possible to improve driving convenience and safety.

These and other features and advantages are described in greater detail below.

DETAILED DESCRIPTION

Figure 1:
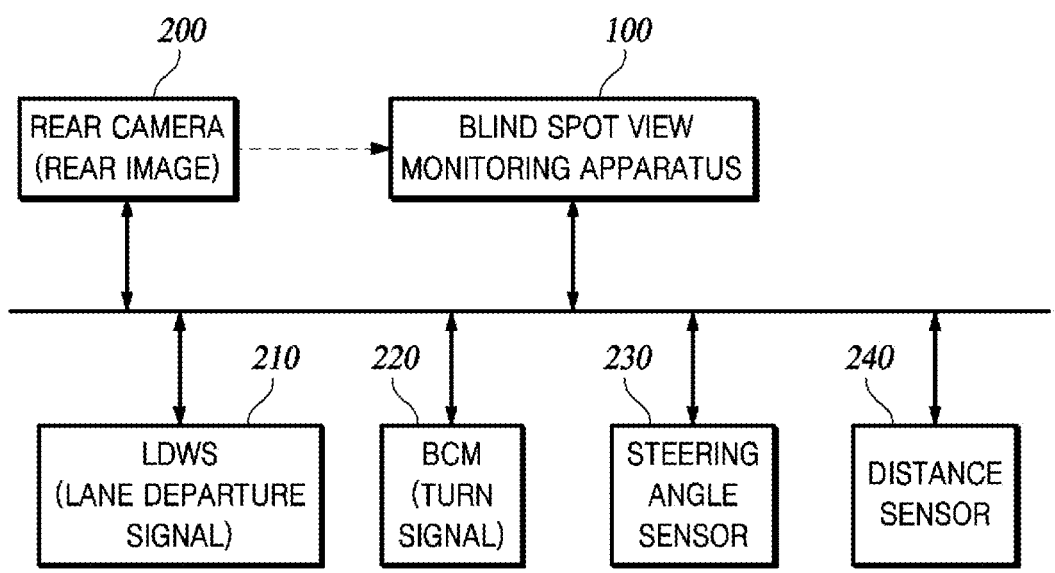
FIG. 1 is a diagram of a blind spot view monitoring system for a vehicle based on a rear camera.

Hereinafter, various examples of the present disclosure will be described in detail with reference to the accompanying illustrative drawings. In the following description, like reference numerals preferably designate like elements, although the elements are shown in different drawings. Further, in the following description, a detailed description of related known components and functions when considered to obscure the subject of the present disclosure may be omitted for the purpose of clarity and for brevity.

Various ordinal numbers or alpha codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The description of the present disclosure to be presented below in conjunction with the accompanying drawings is intended to describe the features of the present disclosure and is not intended to represent particular embodiments in which the technical idea of the present disclosure may be practiced.

The present disclosure relates to a blind spot monitoring of a vehicle based on a rear camera, and, particularly, to a blind spot view monitoring apparatus for a vehicle that provides a rear side blind spot view using a rear image obtained based on a rear camera having a wide-angle lens and a function of asymmetric lens distortion correction and raises a danger warning alarm at the same time according to driving conditions and the operation method thereof.

FIG. 1 is a diagram of a blind spot view monitoring system for a vehicle based on a rear camera.

As shown in FIG. 1, the blind spot view monitoring system for a vehicle based on a rear camera may include a blind spot view monitoring apparatus 100, a rear camera 200, a lane departure warning system (LDW) 210, a body control module (BCM) 220, a steering angle sensor (SAS) 230, and a distance sensor 240. The blind spot view monitoring system for a vehicle based on a rear camera may further include a steering wheel haptic driving unit (not shown) and a braking unit (not shown).

Components of the blind spot view monitoring system for a vehicle based on a rear camera may communicate (e.g., transmit and/or receive) signals and/or data using various communication protocols in the vehicle. Here, the communication protocols may include at least one of the Controller Area Network (CAN), the CAN with Flexible Data rate (CAN FD), the Local Interconnect Network (LIN), the FlexRay, the Ethernet, or the like.

The rear camera 200 may obtain an image of the rear of a vehicle. The rear camera 200 may provide the obtained rear-view image to a rear-view monitor (RVM), a surround view monitor (SVM), etc. The rear camera 200 may provide the obtained rear-view image to the blind spot view monitoring apparatus 100. The rear camera 200 may have a wide-angle lens and a function of asymmetric lens distortion correction, but aspects are not limited thereto.

Figure 2A:
FIGS. 2A and 2B are exemplary diagrams showing an original image with asymmetric lens distortion caused by a wide-angle lens and a part of a corrected image by asymmetric lens distortion correction, respectively.
Figure 2B:

A wide-angle lens or fisheye lens used for a vehicle camera may be designed to have a horizontal angle of view larger than a vertical angle of view, with an emphasis on securing a driver's left and right viewing angles. This may cause an asymmetric distortion. Asymmetric lens distortion correction refers to correcting such asymmetric distortion. FIG. 2A shows an example of an original rear image with asymmetric lens distortion caused by a wide-angle lens of a rear camera, and FIG. 2B shows an example of a left rear area image obtained by correcting the area indicated by the rectangle in FIG. 2A using asymmetric lens distortion correction function of a rear camera.

The lane departure warning system 210 may detect a lane departure (e.g., a lane departure caused by driver's negligence) and provide a warning alarm to the driver. If a lane departure is detected, the lane departure warning system 210 may provide a warning alarm through an indicator light on a dashboard, a warning sound, and/or a haptic signal, but may not display a rear side image. However, safety and convenience of driving may be improved if an image from the rear side in the direction of the lane departure is also displayed with the provision of a lane departure warning.

If a lane departure is detected, the lane departure warning system 210 may provide a lane departure warning signal to the blind spot view monitoring apparatus 100 for co-operative control with the blind spot view monitoring apparatus 100.

The body control module 220 may provide a turn signal to the blind spot view monitoring apparatus 100. The turn signal may include a left turn or right turn direction indication signal.

The steering angle sensor 230 may be a sensor that senses the angle, direction, and/or angular velocity of a steering wheel and may provide steering information to the blind spot view monitoring apparatus 100.

The distance sensor 240 may be a sensor that measures a distance to an object to be measured and may operate based on images and/or time of flight (ToF). Examples of the distance sensor may include an ultrasonic sensor, an infrared sensor, lidar, radar, a camera, etc. In an example, an ultrasonic sensor for recognizing a parking space may be equipped in a vehicle. The distance sensor 240 may provide the blind spot view monitoring apparatus 100 with information on a distance and proximity to a sensed object, etc.

The blind spot view monitoring apparatus 100 may provide an image of a rear side blind spot by utilizing a rear image obtained based on the rear camera 200. The blind spot view monitoring apparatus 100 may provide an image of a rear side blind spot according to driving conditions. The driving conditions may include a risk of collision (e.g., the distance between the object and the vehicle being less than a threshold distance, the object being within the blind spot, etc.) to an object approaching from the rear side of the vehicle. The blind spot view monitoring apparatus 100 may further perform a haptic warning and/or one-side braking according to driving conditions. Hereinafter, further descriptions will be provided with reference to FIG. 3.

The blind spot view monitoring apparatus 100 may include all or some of an image acquisition unit 110, a control unit 120, and a display unit 130.

Figure 3:
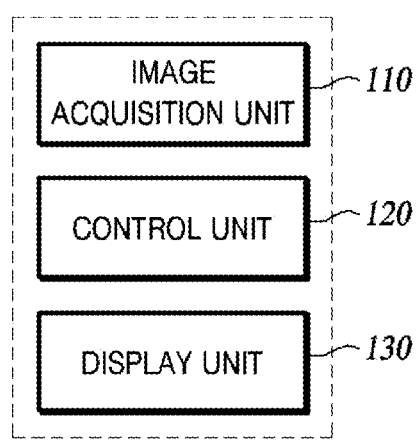
FIG. 3 is a block diagram of an example blind spot view monitoring apparatus for a vehicle based on a rear camera.

An example of the blind spot view monitoring apparatus 100 is shown in FIG. 3, and some components thereof may be added, changed, or removed in certain configurations. For example, in some configurations, the blind spot view monitoring apparatus 100 may further include a communication unit (not shown) that transmits or receives signals or data with components of a blind spot view monitoring system for a vehicle based on a rear camera.

In FIG. 3, the blind spot view monitoring apparatus 100 is illustrated as an apparatus for convenience of description. In certain configurations of the blind spot view monitoring apparatus 100, one or more components thereof may be in the form of hardware or software or in the form of a combination of hardware and software. a function of each component may be fulfilled in software, and one or more processors may be formed to perform a function of software corresponding to each component.

The image acquisition unit 110 may obtain a rear image from the rear camera 200. Here, the rear image may be an image in which asymmetric lens distortion has been corrected.

The control unit 120 may start blind spot monitoring by using a turn signal or a lane departure signal of a vehicle as a trigger. In an example, the control unit 120 may set a corresponding region of interest in a rear image obtained by the image acquisition unit 110 based on a turn signal or a lane departure signal of the vehicle. The control unit 120 may determine whether there is a risk of collision (e.g., due to the proximity of the vehicle to an object in the region of interest) in order to provide an image of a blind spot according to driving conditions. The control unit 120 may generate an image of a blind spot view from a rear image, including a warning signal based on whether or not there is the risk of collision. The generated image of a blind spot view may be displayed on at least one of a cluster, a room mirror, a head-up display, and a navigation by the display unit 130. The control unit 120 may control the overall operation of the blind spot view monitoring apparatus 100.

The control unit 120 may set a corresponding region of interest in a rear image based on a turn signal or a lane departure signal of a vehicle. This may be to form an image of a blind spot view by setting an area to be monitored from the rear image. The region of interest may be preset. If a turn signal indicates a left turn or a lane departure signal indicates a left lane departure, the control unit 120 may set a certain area corresponding to the left side of the traveling direction of the vehicle in the rear image as a region of interest. For example, as shown in FIG. 2A, the area surrounded by the rectangle may be set as a region of interest. If a turn signal indicates a right turn or a lane departure signal indicates a right lane departure, the control unit 120 may set a certain area corresponding to the right side of the traveling direction of the vehicle in the rear image as a region of interest.

If there is an object within a set region of interest, the control unit 120 may determine whether there is a risk of collision (e.g., due to the distance between the object and the vehicle). This may be to provide an image of a blind spot with a warning signal when there is the risk of collision. The control unit 120 may determine whether there is a risk of collision based on the distance or relative speed between the object and the vehicle.

The control unit 120 may calculate the distance between an object and the vehicle using an ultrasonic sensor, and may compare the calculated distance with a threshold distance to determine whether there is a risk of collision.

The control unit 120 may calculate a relative speed or distance between an object and the vehicle based on a rear image, and may determine whether there is a risk of collision based on the calculated relative speed or distance. For example, the control unit 120 may calculate the distance between an object and the vehicle based on a virtual grid in a rear image, and may compare the calculated distance with a threshold distance to determine whether there is a risk of collision. For example, the control unit 120 may calculate a relative speed between an object and the vehicle based on a change in position of a same object in images taken at different times by a rear camera, and may compare the calculated relative speed with a threshold speed to determine whether there is a risk of collision. In an example, the positional change of the same object may be determined using a virtual grid. The distance and/or relative speed may be calculated in various ways (e.g., using one or more sensors, such as cameras, lidars, vehicle speed sensors, position sensors, etc.).

The control unit 120 may generate an image of a blind spot including auxiliary lines from a rear image, and may generate an image of a blind spot and a warning signal when there is a risk of collision. The image of the blind spot may be displayed with a warning indicator (e.g., a visual warning signal).

If the control unit 120 determines that there is no object in an region of interest or there is no risk of collision, it may crop a part corresponding to the region of interest in a rear image and add a plurality of guide lines (e.g., auxiliary lines spaced a certain distance from the vehicle in lateral and longitudinal directions on the cropped part of the image) to generate an image of a blind spot.

Figure 4A:
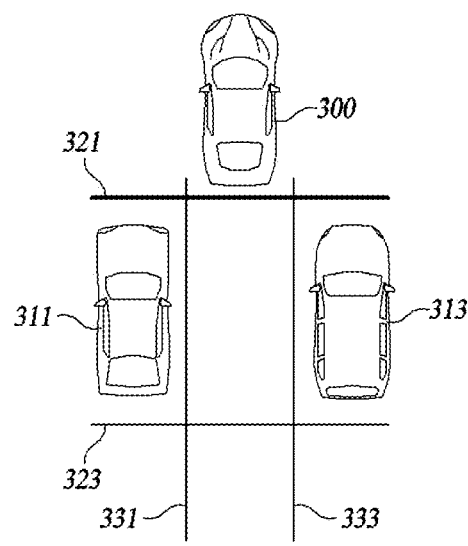
FIGS. 4A and 4B are exemplary diagrams for describing auxiliary lines and/or a warning for a risk of collision that are displayed on an image of a blind spot based on whether there is the risk of collision.

For example, as shown in FIG. 4A, a first longitudinal distance guide line 321 and a second longitudinal distance guide line 323 spaced a certain distance from the vehicle in a longitudinal direction may be displayed. A left lateral distance guide line 331 and a right lateral distance guide line 333 spaced a certain distance from the vehicle in a lateral direction may be displayed. The first longitudinal distance guide line 321 may be a guide line indicating a longitudinal distance for warning of a risk of collision of a vehicle 311 in the left rear and/or a vehicle 313 in the right rear, and the second longitudinal distance guide line 323 may be a guide line indicating a longitudinal distance for alerting a driver to the approach of the vehicle 311 in the left-rear direction and/or the vehicle 313 in the right-rear direction. The first longitudinal distance guide line 321 and the second longitudinal distance guide line 323 may be displayed in different colors.

If the control unit 120 determines that there is a risk of collision, it may crop a part corresponding to an region of interest in a rear image and add a plurality of guide lines spaced a certain distance from the vehicle in lateral and longitudinal directions on the cropped part of the image to generate an image of a blind spot further including a warning indicator for indicating the risk of collision.

Figure 4B:
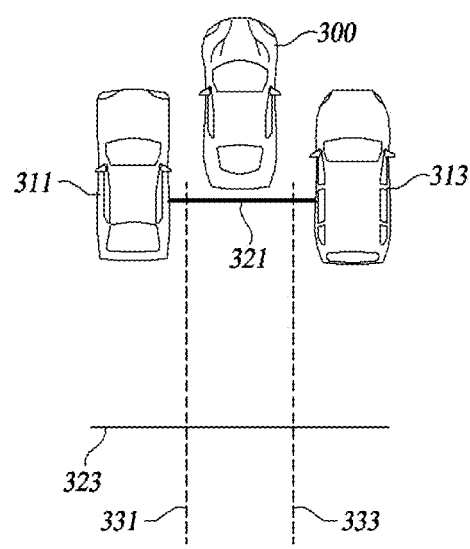

For example, as shown in FIG. 4B, if the vehicle 311 in the left-rear direction and/or the vehicle 313 in the right-rear direction pass the first longitudinal distance guide line such that the vehicle(s) are located in proximity to the vehicle 300, a warning indicator for indicating a risk of collision may be displayed by changing the color of the left lateral distance guide line 331 and/or the right lateral distance guide line 333 or making them blink. In some configurations, a warning indicator for indicating a risk of collision may be displayed in other various ways.

The control unit 120 may determine whether a driver is steering in a direction in which there is a risk of collision and perform a haptic warning and/or one-side braking control. The control unit 120 may determine whether the driver is steering in the direction in which there is a risk of collision based on steering information. The steering information may include at least one of the angle, direction, and angular velocity of a steering wheel. The steering information may be obtained using the steering angle sensor 230 or an electronic stability control (ESC) (not shown), but aspects of the present disclosure are not limited thereto.

If it is determined that a driver is steering in a direction in which there is a risk of collision, the control unit 120 may transmit a control signal for generating vibration to a steering wheel haptic driving unit. If it is determined that the driver is steering in a direction in which there is a risk of collision, the control unit 120 may transmit a control signal to the braking unit in order to apply braking force to a rear wheel in the steering direction.

The display unit 130 may display an image of a blind spot generated by the control unit 120. The display unit 130 may display an image of a blind spot on a cluster, room mirror, head-up display, navigation, etc.

The communication unit (not shown) may communicate (e.g., transmit and/or receive) signals and/or data using various communication protocols (e.g., communication between components in a vehicle or communication with an external device). For example, the communication unit may exchange signals or data with the lane departure warning system 210, the body control module 220, the steering angle sensor 230, the distance sensor 240, the steering wheel haptic driving unit (not shown), the braking unit (not shown), the electronic stability control (not shown), etc.

Figure 5:
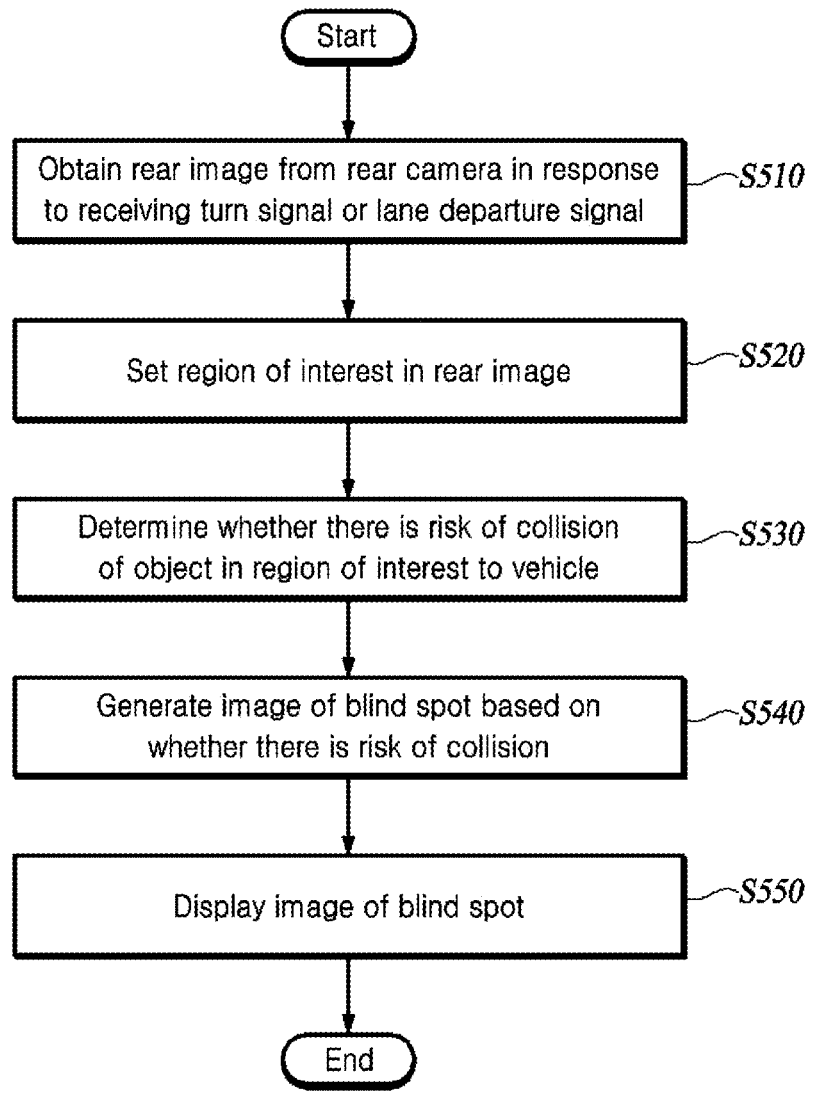
FIG. 5 is a flowchart of an example method for monitoring a blind spot of a vehicle based on a rear camera.

FIG. 5 is a flowchart of an example method for monitoring a blind spot of a vehicle based on a rear camera.

Referring to FIG. 5, the blind spot view monitoring apparatus 100 may start operating when receiving a turn signal or a lane departure signal of the vehicle and obtain a rear image from the rear camera 200 mounted on the vehicle at S510. The turn signal may be a signal indicating a left turn or a right turn received from the body control module 220. The lane departure signal may be a signal received from the lane departure warning system 210.

The blind spot view monitoring apparatus 100 may set a region of interest in a rear image based on a turn signal or a lane departure signal at S520. A region of interest corresponding to the rear side of the vehicle may be set.

If there is an object in the region of interest, the blind spot view monitoring apparatus 100 may determine whether there is a risk of collision of the vehicle to the object in the region of interest at S530.

The blind spot view monitoring apparatus 100 may generate an image of a blind spot based on whether there is a risk of collision at S540. The blind spot view monitoring apparatus 100 may generate an image of a blind spot including auxiliary lines from a rear image, and may generate an image of a blind spot further including a warning indicator when there is a risk of collision (e.g., the distance between the object and the vehicle being less than a threshold distance, the object being within the blind spot, etc.).

The blind spot view monitoring apparatus 100 may display the generated image of a blind spot on a display at S550. Here, examples of the display may include a cluster, a room mirror, a head-up display, a navigation, etc., but aspects are not limited thereto.

The above-mentioned method may further include a process in which, if it is determined that there is a risk of collision, the blind spot view monitoring apparatus 100 may determine whether a driver is steering in a direction in which there is the risk of collision and perform a haptic warning and/or one-side braking control. For example, the above-mentioned method may further include a process in which, if it is determined that there is a risk of collision, the blind spot view monitoring apparatus 100 may transmit a control signal for generating vibration to the steering wheel haptic driving unit based on steering information of the vehicle. For example, the above-mentioned method may further include a process in which, if it is determined that there is a risk of collision, the blind spot view monitoring apparatus 100 may transmit a control signal to the braking unit in order to apply braking force to rear wheels in a steering direction based on steering information of the vehicle.

Each component of a device or a method according to the present disclosure may be in the form of hardware or software or in the form of a combination of hardware and software. In addition, a function of each component may be fulfilled in software, and a processor may be formed to perform a function of software corresponding to each component.

According to at least one aspect, the present disclosure provides a blind spot view monitoring apparatus for a vehicle based on a rear camera, including an image acquisition unit, a control unit and a display unit. The image acquisition unit is configured to obtain a rear image from a rear camera mounted on a vehicle. The control unit is configured to set a region of interest in the rear image based on a turn signal or a lane departure signal of the vehicle, to determine whether there is a risk of proximity of an object in the region of interest to the vehicle, and to generate a blind spot image based on whether there is the risk of proximity. The display unit is configured to display the blind spot image.

The control unit may transmit a control signal for generating vibration based on steering information of the vehicle to a steering wheel haptic driving unit when it is determined that there is the risk of proximity.

The control unit may transmit a control signal to a braking unit in order to apply braking force to rear wheels in a steering direction based on steering information of the vehicle when it is determined that there is the risk of proximity.

According to an aspect, the present disclosure provides, a method of monitoring a blind spot by a blind spot view monitoring apparatus for a vehicle based on a rear camera, including obtaining a rear image from a rear camera mounted on the vehicle in response to receiving a turn signal or a lane departure signal of the vehicle, setting a region of interest in the rear image based on the turn signal or the lane departure signal, determining whether there is a risk of proximity of an object in the region of interest to the vehicle, generating a blind spot image based on whether there is the risk of proximity, and displaying the blind spot image.

The method may further include transmitting a control signal for generating vibration based on steering information of the vehicle to a steering wheel haptic driving unit when it is determined that there is the risk of proximity.

The method may further include transmitting a control signal to a braking unit in order to apply braking force to rear wheels in a steering direction based on steering information of the vehicle when it is determined that there is the risk of proximity.

The various features of the systems and techniques described herein may be implemented as digital electronic circuits, integrated circuits, field programmable gate arrays (FPGAs), application specific integrated circuits (ASICs), computer hardware, firmware, software, and/or combinations thereof. Such various features may be implemented as one or more computer programs executable on a programmable system. The programmable system may include at least one programmable processor (which may be a special purpose processor or a general-purpose processor) coupled to receive data and instructions from and transmit data and instructions to a storage system, at least one input device, and at least one output device. Computer programs (also known as programs, software, software applications, or codes) may contain instructions for a programmable processor, and may be stored in a computer-readable recording medium.

Examples of the computer-readable recording medium may include all types of recording devices in which data that can be read by a computer system is stored. Such computer-readable recording media may be non-volatile or non-transitory media such as ROM, CD-ROM, magnetic tape, floppy disk, memory card, hard disk, magneto-optical disk, and storage device, and may also be a transitory medium such as a data transmission medium. The computer-readable recording media may be distributed in computer systems connected through a network, and computer-readable codes may be stored and executed in a distributed manner.

In the flowcharts in the present disclosure, it is described that each process may sequentially occur, but each step may be performed in different orders and/or at least two steps may be performed simultaneously.

Although various examples of the present disclosure have been described for illustrative purposes, those skilled in the art will appreciate that various modifications, additions, and substitutions are possible, without departing from the idea and scope of the present disclosure. The scope of the technical idea of the present disclosure is not limited to the illustrated examples. Accordingly, one of ordinary skill would understand the scope of the present disclosure is not to be limited by the above explicitly described examples but by the claims and equivalents thereof.

What is claimed is:

1. An apparatus comprising:
   a display device;
   at least one processor; and
   memory storing instructions that, when executed by the at least one processor, cause the apparatus to:
   obtain a rear-view image based on an operation of a rear camera of a vehicle;
   set a region of interest in the rear-view image, wherein the region of interest corresponds to at least one blind spot area of the vehicle determined based on a turn signal of the vehicle or a lane departure signal of the vehicle;

determine that an object is in the region of interest;

generate, based on the object being in the region of interest, a blind spot image comprising a plurality of auxiliary lines; and display, via the display device, the blind spot image, wherein the plurality of auxiliary lines comprise one or more lateral distance guide lines and one or more longitudinal distance guide lines each spaced a predetermined distance from the vehicle, and serve as reference thresholds for determining whether the object has entered a collision risk region.

2. The apparatus of claim 1, further comprising:

the rear camera, wherein the rear camera is configured to apply an asymmetric lens distortion to generate the rear-view image for blind spot monitoring, and wherein the rear-view image is adjusted by applying the asymmetric lens distortion to a captured image of the rear camera.

3. The apparatus of claim 1, wherein the instructions that, when executed by the at least one processor, further cause the apparatus to:

calculate, using an ultrasonic sensor, a distance between the object in the region of interest and the vehicle; and determine, based on the calculated distance, that a risk of collision is greater than a threshold, and wherein the instructions that, when executed by the at least one processor, cause the apparatus to determine to display the blind spot image based on the risk of collision being greater than the threshold.

4. The apparatus of claim 1, wherein the instructions that, when executed by the at least one processor, further cause the apparatus to:

calculate a relative speed between the object in the region of interest and the vehicle, and determine, based on the calculated relative speed, that a risk of collision is greater than a threshold, and wherein the instructions that, when executed by the at least one processor, cause the apparatus to determine to display the blind spot image based on the risk of collision being greater than the threshold.

5. The apparatus of claim 4, wherein the instructions that, when executed by the at least one processor, cause the apparatus to calculate the relative speed by calculating, using a plurality of consecutive rear images obtained from the rear camera, the relative speed between the object in the region of interest and the vehicle.

6. The apparatus of claim 1, wherein the blind spot image further comprises a warning indicator for indicating a collision risk.

7. The apparatus of claim 1, wherein the instructions that, when executed by the at least one processor, further cause the apparatus to transmit, to a vibration generator of a steering wheel of the vehicle, a control signal for generating a vibration signal based on:

steering information of the vehicle;

the object being in the region of interest; and a determination that a risk of collision is greater than a threshold.

8. The apparatus of claim 1, wherein the instructions that, when executed by the at least one processor, further cause the apparatus to transmit, to a brake controller, a control signal for applying braking force to a rear wheel located on a side corresponding to a steering direction of the vehicle based on:

steering information of the vehicle;

the object being in the region of interest; and a determination that a risk of collision is greater than a threshold.

9. A method performed by an apparatus of a vehicle, the method comprising:

obtaining a rear-view image based on an operation of a rear camera of the vehicle;

setting a region of interest in the rear-view image, wherein the region of interest corresponds to at least one blind spot area of the vehicle determined based on a turn signal of the vehicle or a lane departure signal of the vehicle;

determining that an object is in the region of interest;

generating, based on the object being in the regions of interest, a blind spot image comprising a plurality of auxiliary lines; and displaying, via a display device, the blind spot image, wherein the plurality of auxiliary lines comprise one or more lateral distance guide lines and one or more longitudinal distance guide lines each spaced a predetermined distance from the vehicle, and serve as reference thresholds for determining whether the object has entered a collision risk region.

10. The method of claim 9, wherein the rear camera is configured to apply an asymmetric lens distortion to generate the rear-view image for blind spot monitoring, and wherein the rear-view image is adjusted by applying the asymmetric lens distortion to a captured image of the rear camera.

11. The method of claim 9, further comprising:

calculating, using an ultrasonic sensor, a distance between the object in the region of interest and the vehicle; and determining, based on the calculated distance, that a risk of collision is greater than a threshold, wherein the blind spot image is displayed based on the risk of collision being greater than the threshold.

12. The method of claim 9, further comprising:

calculating a relative speed between the object in the region of interest and the vehicle; and determining, based on the calculated relative speed, that a risk of collision is greater than a threshold, wherein the blind spot image is displayed based on the risk of collision being greater than the threshold.

13. The method of claim 12, wherein the calculating comprises calculating, using a plurality of consecutive rear images obtained from the rear camera, the relative speed between the object in the region of interest and the vehicle.

14. The method of claim 9, wherein the blind spot image further comprises a warning indicator for indicating a collision risk.

15. The method of claim 9, further comprising transmitting, to a vibration generator of a steering wheel of the vehicle, a control signal for generating a vibration signal based on:

steering information of the vehicle;

the object being in the region of interest; and a determination that a risk of collision is greater than a threshold.

16. The method of claim 9, further comprising transmitting, to a brake controller, a control signal for applying braking force to a rear wheel located on a side corresponding to a steering wheel direction of the vehicle based on:

steering information of the vehicle;

the object being in the region of interest; and a determination that a risk of collision is greater than a threshold.

17. An apparatus comprising:
a display device;
at least one processor; and
memory storing instructions that, when executed by the at least one processor, cause the apparatus to:
  obtain a rear-view image based on an operation of a rear camera of a vehicle;
  set a region of interest in the rear-view image, wherein the region of interest corresponds to at least one blind spot area of the vehicle determined based on a turn signal of the vehicle or a lane departure signal of the vehicle;
  generate, based on an object being in the region of interest, a blind spot image comprising a plurality of auxiliary lines; and
  display, via the display device, the blind spot image,
  wherein the plurality of auxiliary lines comprise one or more lateral distance guide lines and one or more longitudinal distance guide lines, and wherein at least one of the plurality of auxiliary lines is configured to be visually adjusted based on a determination that the object has entered a collision risk region.

18. The apparatus of claim 17, further comprising:
the rear camera, wherein the rear camera is configured to apply an asymmetric lens distortion to generate the rear-view image for blind spot monitoring,
wherein the rear-view image is adjusted by applying the asymmetric lens distortion to a captured image of the rear camera, and
wherein the plurality of auxiliary lines serve as reference thresholds for determining whether the object has entered the collision risk region.

* * * * *